United States Patent
Kim et al.

(10) Patent No.: US 10,440,680 B2
(45) Date of Patent: Oct. 8, 2019

(54) METHOD AND APPARATUS FOR CONTROLLING LOCATION BASED MBMS SERVICE

(71) Applicant: ELECTRONICS AND TELECOMMUNICATIONS RESEARCH INSTITUTE, Daejeon (KR)

(72) Inventors: Hyung-Sub Kim, Daejeon (KR); JeeHyeon Na, Daejeon (KR); Jung Mo Moon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 56 days.

(21) Appl. No.: 15/429,349

(22) Filed: Feb. 10, 2017

(65) Prior Publication Data
US 2017/0238280 A1  Aug. 17, 2017

(30) Foreign Application Priority Data

Feb. 12, 2016 (KR) .................. 10-2016-0016096
Aug. 9, 2016 (KR) .................. 10-2016-0101153

(51) Int. Cl.
*H04W 72/00* (2009.01)
*H04W 4/021* (2018.01)
*H04W 76/27* (2018.01)
*H04L 5/00* (2006.01)
*H04W 72/04* (2009.01)

(52) U.S. Cl.
CPC ......... *H04W 72/005* (2013.01); *H04W 4/021* (2013.01); *H04W 76/27* (2018.02); *H04L 5/006* (2013.01); *H04W 72/0486* (2013.01)

(58) Field of Classification Search
CPC ... H04L 65/1046; H04L 65/103; H04L 65/80; H04L 65/1069; H04L 5/006; H04W 4/003; H04W 8/18; H04W 4/60; H04W 84/08; H04W 4/08; H04W 4/10; H04W 72/005; H04W 4/021; H04W 72/0413; H04W 72/042; H04W 76/046; H04W 76/27; H04W 72/0486
See application file for complete search history.

(56) References Cited

U.S. PATENT DOCUMENTS

| | | | |
|---|---|---|---|
| 2010/0272004 A1* | 10/2010 | Maeda | H04L 5/0007 370/312 |
| 2011/0044223 A1 | 2/2011 | Kim et al. | |
| 2011/0149831 A1 | 6/2011 | Hyun et al. | |
| 2012/0026929 A1* | 2/2012 | Wang | H04W 72/005 370/312 |

(Continued)

FOREIGN PATENT DOCUMENTS

KR  10-1333918 B1  11/2013

*Primary Examiner* — Jung Liu
(74) *Attorney, Agent, or Firm* — LRK Patent Law Firm

(57) ABSTRACT

A method and an apparatus for controlling an MBMS service provided at a specific location in an LTE system. In an MBMS service system of the present invention, it is possible to efficiently control and manage a valid MBMS service only at a specific location. For example, it is possible to more efficiently manage the effective MBMS content only in the specific cell or the specific cluster (set of the specific cells).

12 Claims, 12 Drawing Sheets

(56) References Cited

U.S. PATENT DOCUMENTS

| | | | | |
|---|---|---|---|---|
| 2012/0236776 | A1* | 9/2012 | Zhang | H04W 48/12 370/312 |
| 2013/0016645 | A1* | 1/2013 | Moriwaki | H04L 12/185 370/312 |
| 2013/0182584 | A1* | 7/2013 | Maguluri | H04W 76/14 370/252 |
| 2014/0029579 | A1* | 1/2014 | Cho | H04W 8/082 370/331 |
| 2014/0219248 | A1* | 8/2014 | Reddiboyana | H04W 76/15 370/331 |
| 2014/0341104 | A1* | 11/2014 | Zhao | H04W 48/00 370/312 |
| 2014/0372624 | A1* | 12/2014 | Wang | H04L 65/60 709/231 |
| 2015/0009874 | A1* | 1/2015 | Edara | H04W 52/0225 370/311 |
| 2015/0229677 | A1* | 8/2015 | Gu | H04L 65/103 709/219 |
| 2015/0230063 | A1* | 8/2015 | Chandramouli | H04W 4/70 455/466 |
| 2016/0353498 | A1* | 12/2016 | Enomoto | H04W 60/04 |
| 2018/0160274 | A1* | 6/2018 | Byun | H04W 24/02 |

* cited by examiner

METHOD AND APPARATUS FOR CONTROLLING LOCATION BASED MBMS SERVICE

CROSS-REFERENCE TO RELATED APPLICATIONS

This application claims priority to and the benefit of Korean Patent Application Nos. 10-2016-0016096 and 10-2016-0101153, filed in the Korean Intellectual Property Office on Feb. 12, 2016 and Aug. 9, 2016, respectively, the entire contents of which are incorporated herein by reference.

BACKGROUND OF THE INVENTION

1. Field of the Invention

The present invention relates to a method and an apparatus for controlling a location based multimedia broadcast multicast service (MBMS) service.

2. Description of Related Art

A multimedia broadcast multicast service (MBMS) means a broadcasting service specified by the 3rd Generation Partnership Project (3GPP) of the International Organization for Standardization. To provide the MBMS, besides terminals/base stations/ePCs (MME/GW), or the like configuring the existing long term evolution (LTE), function nodes such as a broadcast/multicast service center (BMSC) managing a broadcast content, a multi-cell/multicast coordination entity (MCE) managing MBMS control information, and an MBMS gateway (MBMS GW) controlling/managing MBMS traffic are additionally required.

The MBMS provides a synchronized service to a specific area managed by the BMSC. That is, for the MBMS technology to serve a specific content, the BM-SC may have to control the specific content. This means that all the traffics are transmitted up to the BMSC and then need to be served through the MBMS GW again to serve effective broadcast in real time only in specific areas (large shopping mall, disaster area, or the like).

SUMMARY OF THE INVENTION

The present invention has been made in an effort to provide a method and an apparatus for controlling an MBMS service provided at a specific location using a mobile communication (for example, LTE) system.

Technical problems of the present invention are not limited to the above-mentioned matters and other technical problems which are not mentioned can be clearly understood to those skilled in the art from the following descriptions.

An exemplary embodiment of the present invention provides a broadcasting service method using a base station, including: determining a forwarding scheme depending on a broadcast type by receiving uplink broadcasting contents from user equipment; and determining whether to transmit the uplink broadcasting contents by directly mapping the uplink broadcasting contents to downlink broadcasting contents or whether to transmit the uplink broadcasting contents to a gateway on a network to transmit the downlink broadcasting contents to a plurality of base stations through the gateway, depending on the determined forwarding scheme.

Another embodiment of the present invention provides a broadcasting service method, including: determining a forwarding scheme depending on a broadcast type in one base station by receiving uplink broadcasting contents from user equipment; and performing a downlink transmission through the one base station or a plurality of base stations by mapping the uplink broadcasting contents to downlink broadcasting contents depending the determined forwarding scheme, in which in the performing of the downlink transmission, the one base station may directly perform the mapping to perform the downlink transmission of the downlink broadcasting contents or the one base station may transmit the uplink broadcasting contents to a gateway on the network and the gateway may perform the downlink transmission through a plurality of base stations by mapping the uplink broadcasting contents to the downlink broadcasting contents.

A multimedia broadcast multicast service (MBMS) service may be provided using the base station for supporting mobile communication.

Prior to the determining of the forwarding scheme, the UE may transmit a message for bearer setup to mobility management entity through the base station using a non access stratum (NAS) message to control the mobility management entity to configure an unlink bearer.

Prior to the determining of the forwarding scheme, if the UE transmits a message for bearer setup to the base station using a radio resource control (RRC) message, the base station may transmit additional information to mobility management entity by including the additional information in the message for the bearer setup to control the mobility management entity to configure an uplink bearer.

The additional information may include an uplink signal-to-interface-plus-noise ratio (SINR) between the UE and the base station to be referenced at the time of setup of a quality of service (QoS) for a broadcasting service session in the mobility management entity.

Prior to the determining of the forwarding scheme, after the uplink bearer is set in the mobility management entity according to a request of the UE, in the mobility management entity, a session for the one base station or the plurality of base stations may be set depending on the broadcast type and a downlink bearer ID and session information may be transmitted to the corresponding base station or the base stations and the gateway.

When the one base station performs the downlink transmission of the uplink broadcasting contents, the one base station performing sequential processing at PHY-MAC-RLC-PDCP-GTP layers may map the uplink broadcasting contents to downlink broadcasting contents at the RLC, PDCP, or GTP layer to forward the downlink broadcasting contents through a downlink bearer.

When the gateway performs the downlink transmission of the uplink broadcasting contents through a plurality of base stations, if the gateway receives the GTP-packetized uplink broadcasting contents from the one base station to map the uplink broadcasting contents to the downlink broadcasting contents to transmit the downlink broadcasting contents to the plurality of base station, each base station may perform sequential processing of GTP-PDCP-RLC-MAC-PHY layers on the downlink broadcasting contents and forward the downlink broadcasting contents through a downlink bearer.

In the performing of the downlink transmission, in a proxy server performing image data processing by receiving broadcasting contents processed at a MAC layer of the base station, when the broadcast type is enb_single, the broadcasting contents whose image data are processed may be transmitted to an RLC layer of the base station to allow the base station to map the uplink broadcasting contents to the downlink broadcasting contents at the RLC, PDCP, or GTP layer to perform a control to forward the downlink broadcasting contents through a downlink bearer.

In the proxy server, when the broadcast type is enb_cluster, the broadcasting contents whose image data are processed may be GTP packetized and transmitted to the gateway and the gateway may receive the GTP-packetized broadcasting contents to map the uplink broadcasting contents to the downlink broadcasting contents to forward the downlink broadcasting contents through the downlink bearer.

Yet another embodiment of the present invention provides a broadcasting system, including: at least one base station; and a gateway broadcasting contents through the base station, in which a forwarding scheme may be determined depending on a broadcast type in one base station by receiving uplink broadcasting contents for activating a service in a specific area from user equipment, and the one base station may perform the downlink transmission by mapping the uplink broadcasting contents to downlink broadcasting contents or the one base station may transmit the uplink broadcasting contents to the gateway, depending on the determined forwarding scheme and the gateway may perform a downlink transmission through a plurality of base stations by mapping the uplink broadcasting contents to the downlink broadcasting content.

A multimedia broadcast multicast service (MBMS) service may be provided using the base station for supporting mobile communication.

The UE may transmit a message for bearer setup to mobility management entity through the base station using a non access stratum (NAS) message to control the mobility management entity to configure an unlink bearer.

If the UE transmits a message for bearer setup to the base station using a radio resource control (RRC) message, the base station may transmit additional information to mobility management entity by including the additional information in the message for the bearer setup to control the mobility management entity to configure an uplink bearer.

The additional information may include an uplink signal-to-interface-plus-noise ratio (SINR) between the UE and the base station to be referenced at the time of setup of a quality of service (QoS) for a broadcasting service session in the mobility management entity.

After the uplink bearer is set in the mobility management entity according to a request of the UE, in the mobility management entity, a session for the one base station or the plurality of base stations may be set depending on the broadcast type and a downlink bearer ID and session information may be transmitted to the corresponding base station or the base stations and the gateway.

When the one base station performs the downlink transmission of the uplink broadcasting contents, the one base station performing sequential processing at PHY-MAC-RLC-PDCP-GTP layers may map the uplink broadcasting contents to downlink broadcasting contents at the RLC, PDCP, or GTP layer to forward the downlink broadcasting contents through a downlink bearer.

When the gateway performs the downlink transmission of the uplink broadcasting contents through a plurality of base stations, if the gateway receives the GTP-packetized uplink broadcasting contents from the one base station to map the uplink broadcasting contents to the downlink broadcasting contents to transmit the downlink broadcasting contents to the plurality of base station, each base station may perform sequential processing of GTP-PDCP-RLC-MAC-PHY layers on the downlink broadcasting contents and forward the downlink broadcasting contents through a downlink bearer.

The broadcasting system may further include: a proxy server receiving the broadcasting contents processed at a MAC layer of the base station to perform image data processing, in which the proxy server may transmit the broadcasting contents whose image data are processed to an RLC layer of the base station when the broadcast type is enb_single to allow the base station to map the uplink broadcasting contents to the downlink broadcasting contents at an RLC, PDCP, or GTP layer to perform a control to forward the downlink broadcasting contents through a downlink bearer.

The proxy server may perform GTP packetization on the broadcasting contents whose image data are processed and transmit the GTP-packetized broadcasting contents to the gateway, when the broadcast type is enb_cluster, and the gateway may receive the GTP-packetized broadcasting contents to map the uplink broadcasting contents to the downlink broadcasting contents to forward the downlink broadcasting contents through the downlink bearer.

DETAILED DESCRIPTION OF THE EMBODIMENTS

Figure 1:
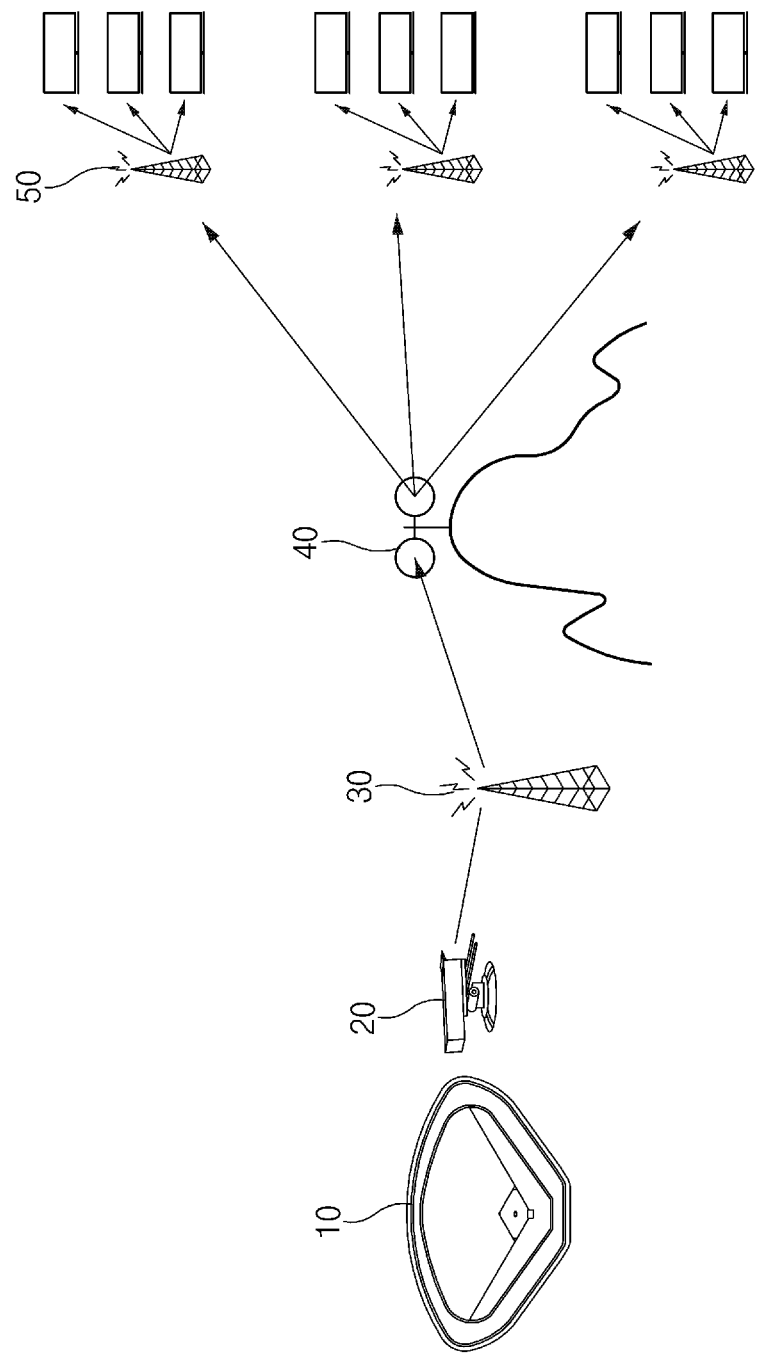
FIG. 1 is a diagram for describing network environment to which an MBMS service system according to an exemplary embodiment of the present invention is applied.

Hereinafter, some exemplary embodiments in the present specification will be described in detail with reference to the illustrative drawings. In adding reference numerals to components of each drawing, even though the same components are illustrated in different drawings, it is to be noted that these components are denoted by same reference numerals if possible. Further, in describing exemplary embodiments of the present invention, well-known functions or constructions will not be described in detail since they may unnecessarily obscure the understanding of the present invention.

In describing components of the present specification, terms such as first, second, A, B, (a), (b), etc. may be used. These terms are used only to differentiate the components from other components. Therefore, the nature, times, sequence, etc. of the corresponding components are not limited by these terms. Further, unless indicated otherwise, it is to be understood that all the terms used in the specification including technical and scientific terms has the same meaning as those that are understood by those who skilled in the art. It must be understood that the terms defined by the dictionary are identical with the meanings within the context of the related art, and they should not be ideally or excessively formally defined unless the context clearly dictates otherwise.

FIG. 1 is a diagram for describing network environment to which an MBMS service system (or apparatus) according to an exemplary embodiment of the present invention is applied. FIG. 1 illustrates the network environment for sports broadcasting, in which the network environment may be similarly applied to even the case in which other broadcasting contents such as other multimedia contents serve.

As illustrated in FIG. 1, for sports broadcasting, an on-spot camera 20 transmits contents (baseball game content data) photographed in a baseball stadium 10, or the like to a central broadcasting station 30 and the central broadcasting station 30 receive the corresponding contents and transmits the received contents to each local broadcasting station 50 through a repeater 40, or the like. Each local broadcasting station 50 receives the corresponding contents and again transmits the received contents to terminals such as television (TV) sets of a home, an office, or the like.

Meanwhile, like a multimedia broadcast multicast service (MBMS), to service specific contents, a broadcast/multicast service center (BMSC) that serves as the broadcasting station, or the like may have to manage all contents. However, it may be very inefficient to transmit, for example, sale information suddenly held at specific areas where shops are crowded, like Myung dong in Seoul, real-time warning broadcasting performed in disaster areas, or contents transmitted from a camera equipped in equipment of a player participating in game in a baseball stadium to BMSC and again transmit them to a terminal through a base station. Further, to transmit broadcasting contents photographed on the spot to a network, various communication modules (LTE, WiFi, or the like) may be used, and therefore it may be very difficult for the BMSC to integrally manage various methods.

Accordingly, the present invention proposes a technology of transmitting broadcasting contents photographed on the spot in real time to a mobile communication (for example, LTE) base station as mobile communication (for example, LTE) uplink traffic and handing off the traffic to downlink MBMS traffic in the mobile communication (for example, LTE) network to serve it through a specific area defined in a specific single base station unit or a plurality of base station units.

Hereinafter, in the case of describing a broadcasting system for MBMS of the present invention, that is, the MBMS service system, a multicast service and a broadcast service are not separately described and a radio signal may be transmitted and received by a multicast or broadcast scheme.

Figure 2A:
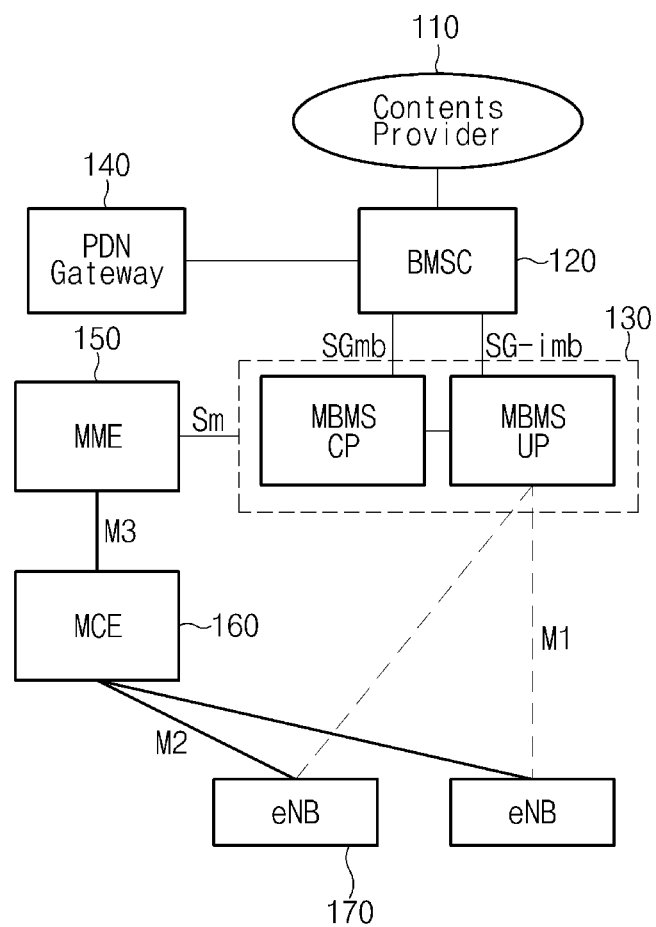
FIGS. 2A and 2B are diagrams for describing the MBMS service system according to the exemplary embodiment of the present invention.
Figure 2B:
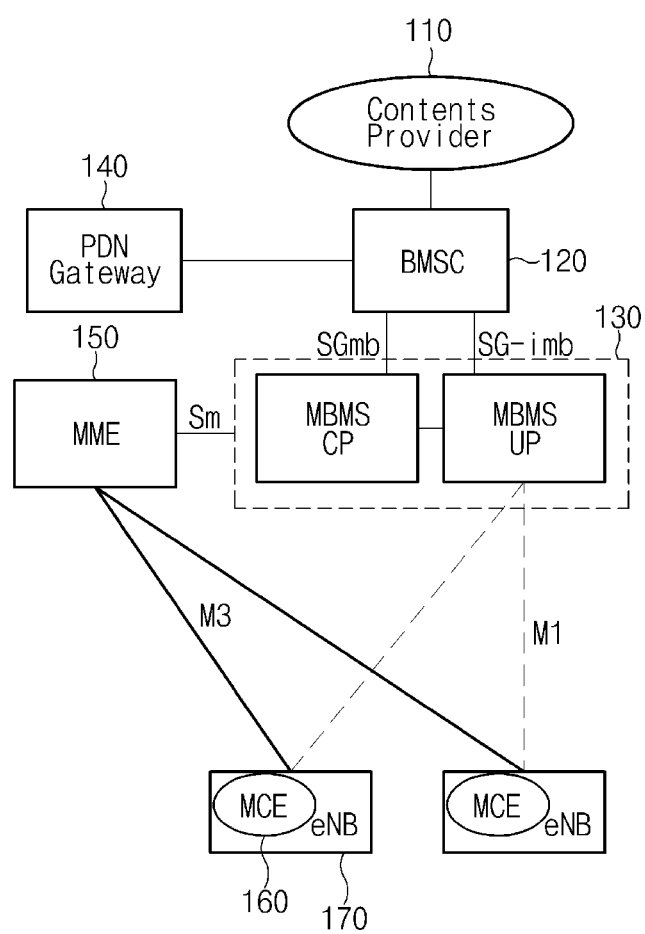

FIGS. 2A and 2B are diagrams for describing the MBMS service system according to the exemplary embodiment of the present invention. FIG. 2A illustrates the case in which multicast coordination entity 160 is implemented as an independent node and FIG. 2B illustrates the case in which the MCE 160 is implemented to be included in a base station 170. Except for the difference, in the structures of FIGS. 2A and 2B, a message flow and a data flow for providing the MBMS are same.

Referring to FIGS. 2A and 2B, the MBMS service system for MBMS according to the exemplary embodiment of the present invention includes a contents provider 110, a broadcast/multicast service center (BMSC) 120, a multimedia broadcast multicast service gateway (MBMS GW) 130, a packet data network (PDN) gateway (PGW) 140, mobility management entity (MME) 150, multicast coordination entity (MCE) 160, and a mobile communication (for example, LTE) base station (evolved Node B (Enb)) 170 that are formed on the network.

The contents provider 110 may provide various kinds of broadcasting contents photographed on the spot and may further provide the broadcasting contents consisting of various digital multimedia data prepared in advance.

The BMSC 120 manages the broadcasting contents received from the contents provider 110, the broadcasting contents received from the PGW 140 through the Internet, or the like.

The MME 150 manages attach information on user equipment (for example, wireless terminal such as a smart phone, a wearable device, a tablet PC, and a laptop PC using mobile communications such as LTE or a wired terminal such as a desktop PC) attached through the base station 170 and a context (for example, session information, or the like) and controls data transmission of the MBMS GW 130, the PGW 140, or the like.

The PGW 140 is controlled by the MME 150 and may transmit data received from the Internet to a destination IP address on the basis of a mobile communication (for example, LTE) protocol and transmit data of the user equipment (UE) received through the base station 170 to the Internet.

The MBMS GW 130 is controlled (Sm) by the MME 150 and may communicate with several base stations 170 through an MI interface (interface for transmission/reception of MBMS traffic) for MBMS service to transmit the MBMS traffic (data required for a service such as broadcasting contents) from the BMSC, the user equipment (UE), or the like through several base stations 170, thereby performing the broadcasting. For this purpose, the MBMS GW 130 may include an MBMS control plane (MBMS CP) for an overall control depending on a signal (SGmb/SG-imb) transmitted and received to and from the BMSC 120 and an MBMS user plane (UP) for data transmission of the UE.

The MCE 160 performs an integrated management function of an MBMS service related radio resource. The MCE 160 is controlled by the MME 150 through an M3 interface (interface for transmitting/receiving an MBMS control message) and may control the base station 170 through an M2 interface (interface for transmitting/receiving an MBMS control message). As illustrated in FIG. 2B, when the MCE 160 is included in the base station 170, the M2 interface may be omitted and the MME 150 may transmit/receive the MBMS control message to and from the base station 170 through the M3 interface to control the base station 170.

The base station 170 may be controlled by the MME 150 to transmit the uplink traffic transmitted from the user equipment to the MBMS GW 130 on the network depending on routing of a layer 3 control plane (L3CP) layer by each sequential processing (refer to FIG. 7) at a PHY-MAC-RLC-PDCP-GTP layer if necessary (for example, in the case of broadcastType=enb_cluster) as described below. Here, physical (PHY), a media access control (MAC), a radio link control (RLC), a packet data convergence protocol (PDCP), a GPRS tunneling protocol (GTP), a general packet radio service (GPRS).

Hereinafter, in the MBMS service system according to the exemplary embodiment of the present invention, an operation scheme for activating, by the user equipment attached through the base station 170, the MBMS service only in specific areas through the uplink traffic transmission will be described.

<1. Identification Procedure for Personal Broadcasting Subscriber>

Figure 3:
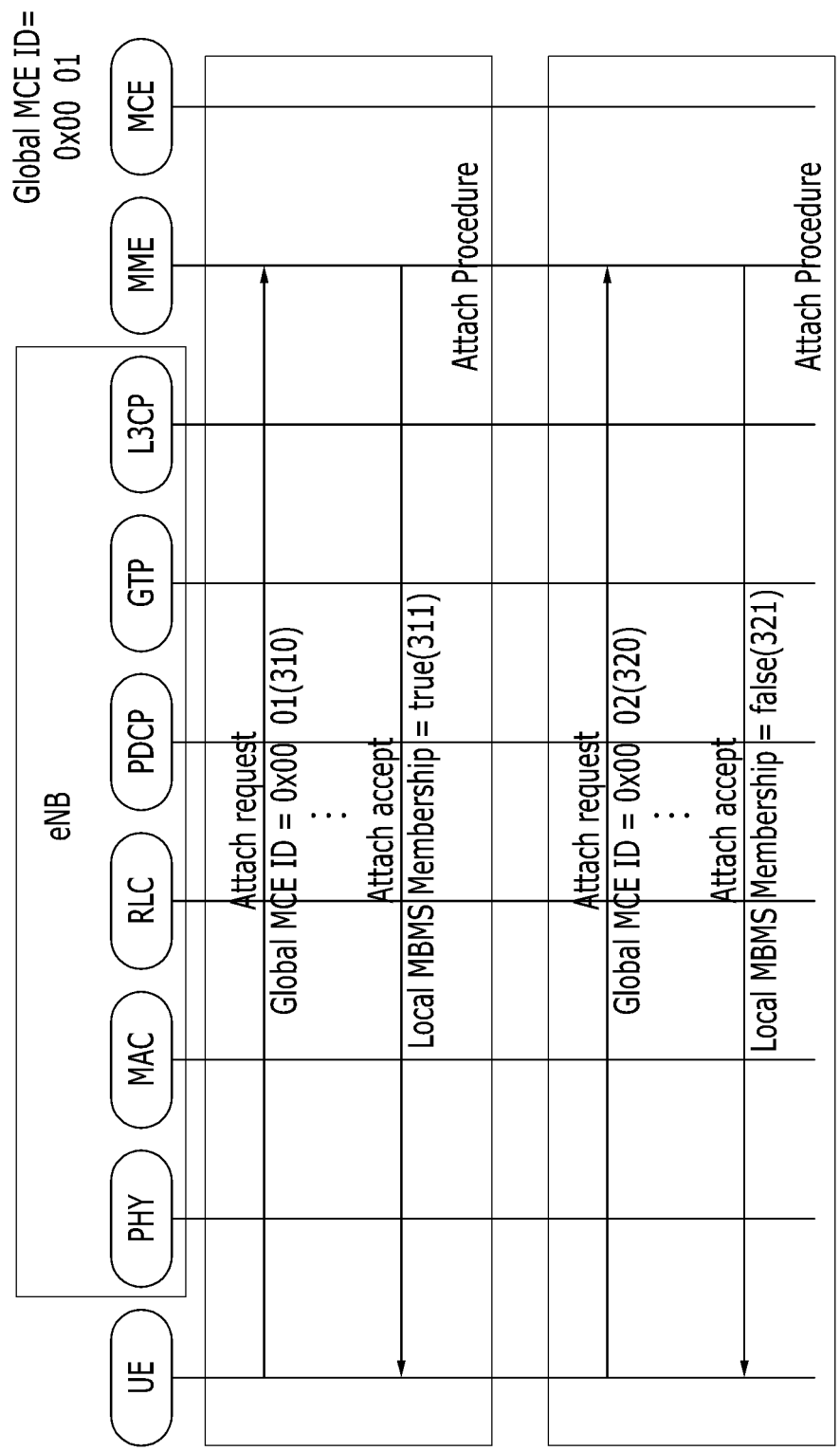
FIG. 3 is a flow chart for describing an identification procedure of a subscriber in the MBMS service system according to the exemplary embodiment of the present invention.

FIG. 3 is a flow chart for describing an identification procedure of a subscriber in the MBMS service system according to the exemplary embodiment of the present invention.

A procedure of attaching the user equipment (UE) attached through the base station 170 to the network to allow the UE to receive a service is called an attach procedure. During the attach procedure, several kinds of non access stratum (NAS) messages are transmitted and received between the UE and the MME 150 through the base station 170. Among the NAS messages, the first transmitted message is an attach request message 310 starting from the user equipment (UE). At this point, an attach request message includes a predetermined MCE ID (for example, 0x00 01). This is a basis for determining whether a specific user is a user for activating the MBMS through the uplink transmission in the MME 150, the MCE 160, or the like and a global MCE ID is required even for an approval procedure on the basis of confirmation on whether the specific user joins the MBMS service by the MME 150, the MCE 160, or the like due to problems of billing, service quality, or the like. The global MCE ID consists of a public land mobile network (PLMN) ID and a multicast coordination entity (MCE) ID of 2 bytes. The PLMN ID is already stored in a universal subscriber identity module (USIM) card of the UE, and therefore the MCE ID needs to be additionally set.

As shown in the following [Table 1], the MME 150 on the network needs to determine, on the basis of subscription conditions, or the like of a user, whether a service radius is one base station or a plurality of base stations managed by one MBMS GW 130 when the UE is a local MBMS member. At this point, the attach request message may include N (natural number) global MCE IDs like a global MCE ID [N].

The MME 150 receiving the attach request message 310 determines (refer to PLMN ID or Global MCE ID) whether the corresponding UE is UE capable of performing the MBMS broadcasting by being linked to a home subscriber server (HSS) that stores and manages subscriber information to transmit an attach accept message 311 from the MME 150 to the UE. At this point, the MME 150 sets local MBMS membership information included in the message to be true, false, or the like and transmits the set local MBMS membership information. During the attach procedure, the UE receiving the attach accept message recognizes that uplink mobile communication (for example, LTE) traffic generated from the UE may be provided to the MBMS when the local MBMS membership is true.

As shown in the following [Table 1], the MME 150 sets the local MBMS membership to be true (sets to be true in the HSS) when the MCE 160 in which a connection is configured through the M3 interface is present in the global MCE IDs included in the received attach request message and may confirm whether the corresponding UE may also perform the MBMS broadcasting on the basis of the subscriber information in the HSS as described above when there is no global MCE ID.

The above-mentioned attach procedure may allow even other UEs to transmit an attach request message 320 and receive an attach accept message 321 to activate an MBMS service through an uplink data transmission.

TABLE 1

| Message | Included information | Remarks |
|---|---|---|
| Attach Request (UE → MME) | Global MCE ID[N] (optional) *Up to N MCE IDs | When the MCE in which a connection is configured through the M3 interface is present in the global MCE ID included in the attach request at the time of receiving a message in the MME, the local MBMS membership is set to be true (in HSS) and when there is no global MCE ID, may be confirmed on the basis of the subscriber information in the HSS |
| Attach accept (MME → UE) | Local MBMS membership | It is recognized that the service may be provided only when the local MBMS membership is true |

*In the network, it may have to determine, on the basis of the subscription conditions of the user, or the like, whether the service radius is one base station or a plurality of base stations managed by one MBMS GW in the case of the local MBMS member <2. Bearer Setup Procedure for LTE Uplink Data Transmission>

As illustrated in FIG. 3, if it is confirmed whether the uplink transmission for the MBMS service may be made, the UE performs the bearer setup procedure for the MBMS service on the network. Generally, a bearer for transmitting/receiving data or a control signal is setup between the UE and the network on the basis of the attach procedure of attaching the UE to the network. The bearer for transmitting/receiving user data is called a data bearer and a bearer setup during the attach procedure is called a default bearer.

The uplink transmission for the MBMS service may also be made through the default bearer but a separate bearer setup procedure is required to implement technologies to be mentioned in the present invention. That is, as there is no method for confirming whether data received by the network through the default bearer are data to be used later for the MBMS, a new procedure for differentiating the data is proposed. However, in an uplink transmission only UE for the MBMS, the default bearer set in the attach procedure may also be used to configure as the bearer for the MBMS without performing a separate additional bearer setup procedure.

Generally, the additional bearer configuring including the default bearer starts while the UE transmits a PDN connectivity request message, which is a NAS message, to the network. Next, in the MME 150, the base station 170, or the like, the bearer is set up to the UE by the procedure of transmitting/receiving a message.

The uplink bearer setup for the MBMS in the present invention proposes a method (refer to FIG. 4) for identically using the existing PDN connectivity request message and a method (refer to FIG. 5) for using an uplink MBMS information transfer (information transfer) message that is a new message.

To set a new bearer through the PDN connectivity request or the UL MBMS information transfer message, a new access point name (APN) needs to be set both in the UE and the network and a processing function thereof needs to be included therein. In the present invention, it is assumed that the access point name (APN) used at the time of the bearer setup for an uplink service is apn_mbms. The bearer setup procedure and the MBMS configuration procedure may depend on the content specified in the existing 3GPP standard.

<a. PDN Connectivity Request>

Figure 4:
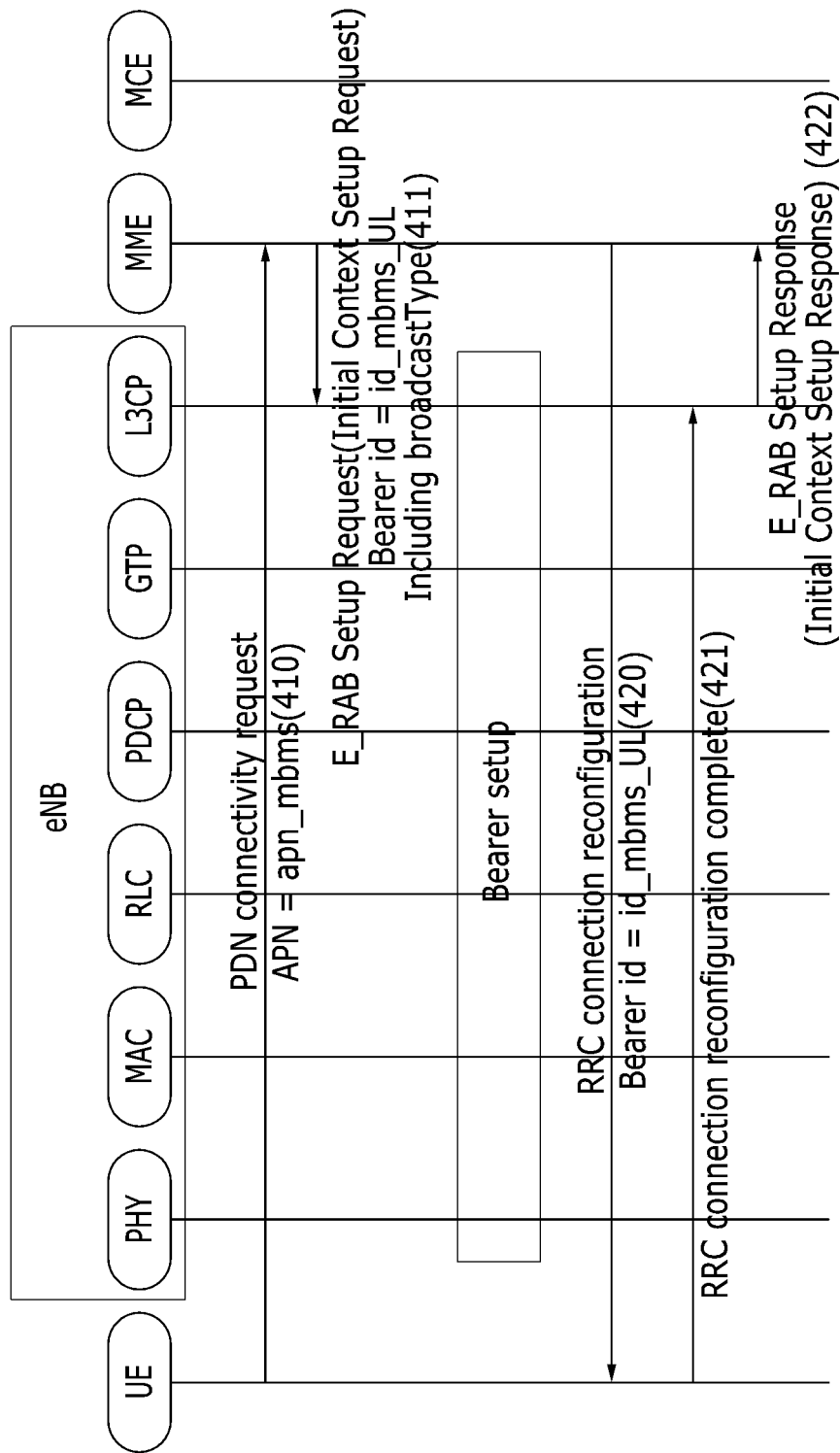
FIG. 4 is a flow chart for describing a scheme of a bearer setup procedure in the MBMS service system according to the exemplary embodiment of the present invention.

FIG. 4 is a flow chart for describing a scheme of a bearer setup procedure in the MBMS service system according to the exemplary embodiment of the present invention.

In FIG. 4, first, for the bearer setup, the UE transmits the PDN connectivity request message, which is a NAS message, to the network (410).

Therefore, the MME 150 receiving the PDN connectivity request message through the base station 170 first determines whether the MBMS service may be provided through the mobile communication (for example, LTE) uplink traffic in consideration of a current resource state, or the like and if it is determined that the MBMS service may not be provided, transmits a PDN connectivity reject message to the UE, and then ends the procedure.

On the other hand, if the MBMS service may be provided in consideration of the resource state, or the like, the MME 150 confirms information in the HSS to determine whether the UE is a user permitted to transmit the uplink data for the MBMS service and if so, determines whether the MBMS service is valid only in one base station or may be provided in a set of a plurality of base stations connected to one MBMS GW 130. Next, when the APN included in the PDN connectivity request message is apn_mbms, the MME 150 configures a previously promised uplink bearer ID (bearer id=id_mbms_UL) to know so that all the corresponding bearers are an uplink bearer for MBMS in the MBMS GW 130, the MCE 160, the base station 170, or the like. The uplink bearer ID (bearer id=id_mbms_UL) includes an evolved radio access bearer (E_RAB) ID, a data radio bearer (DRB) ID, a tunnel endpoint ID (GTP TEID), or the like.

The MME 150 sets several parameters for allocating a bearer corresponding to the bearer ID (bearer id=id_mbms_UL) and then transmits an E_RAB setup request message to the base station 170, including the bearer ID (bearer id=id_mbms_UL) (411). As illustrated in FIG. 3, in the case of the attach procedure, the MME 150 may transmit and process an initial context setup request message.

The E_RAB setup request (or initial context setup request) message includes parameters for a broadcast type like broadcastType={enb_single, enb_cluster}, which as shown in the following [Table 2], may allow the base station 170 to determine whether data received later through the bearer ID (Bearer id=id_mbms_UL) are valid (enb_signal) only in its own area or are valid (enb_cluster) even in other base stations. The enb_signal or the enb_cluster of the broadcast type is determined in advance or may also be determined depending on predetermined information included in the PDN connectivity request message of the UE, or the like.

The base station 170 receiving the E_RAB setup request (or initial context setup request) message configures the corresponding content per protocol in the base station and then notifies the UE of setup information (for example, id_mbms_UL, or the like) on an added bearer through a radio resource control (RRC) connection reconfiguration message (420). Therefore, when receiving a response message from the UE, that is, receiving an RRC connection reconfiguration complete message (421), the base station 170 transmits a response message to a E_RAB setup request (or initial context setup request) message, that is, a E_RAB setup response (or initial context setup response) to the MME 150 (422).

TABLE 2

| Message | Included information | Remarks |
| --- | --- | --- |
| E_RAB setup request (MME → eNB) | broadcastType (optional) = enmu (enb_single, enb_cluster) | Specify area where the MBMS service is valid through the set bearer |
| Initial context setup request (MME → eNB) | broadcastType (optional) = enmu (enb_single, enb_cluster) | Specify areas where the MBMS service is valid through the set bearer |

<b. UL MBMS Information Transfer>

Figure 5:
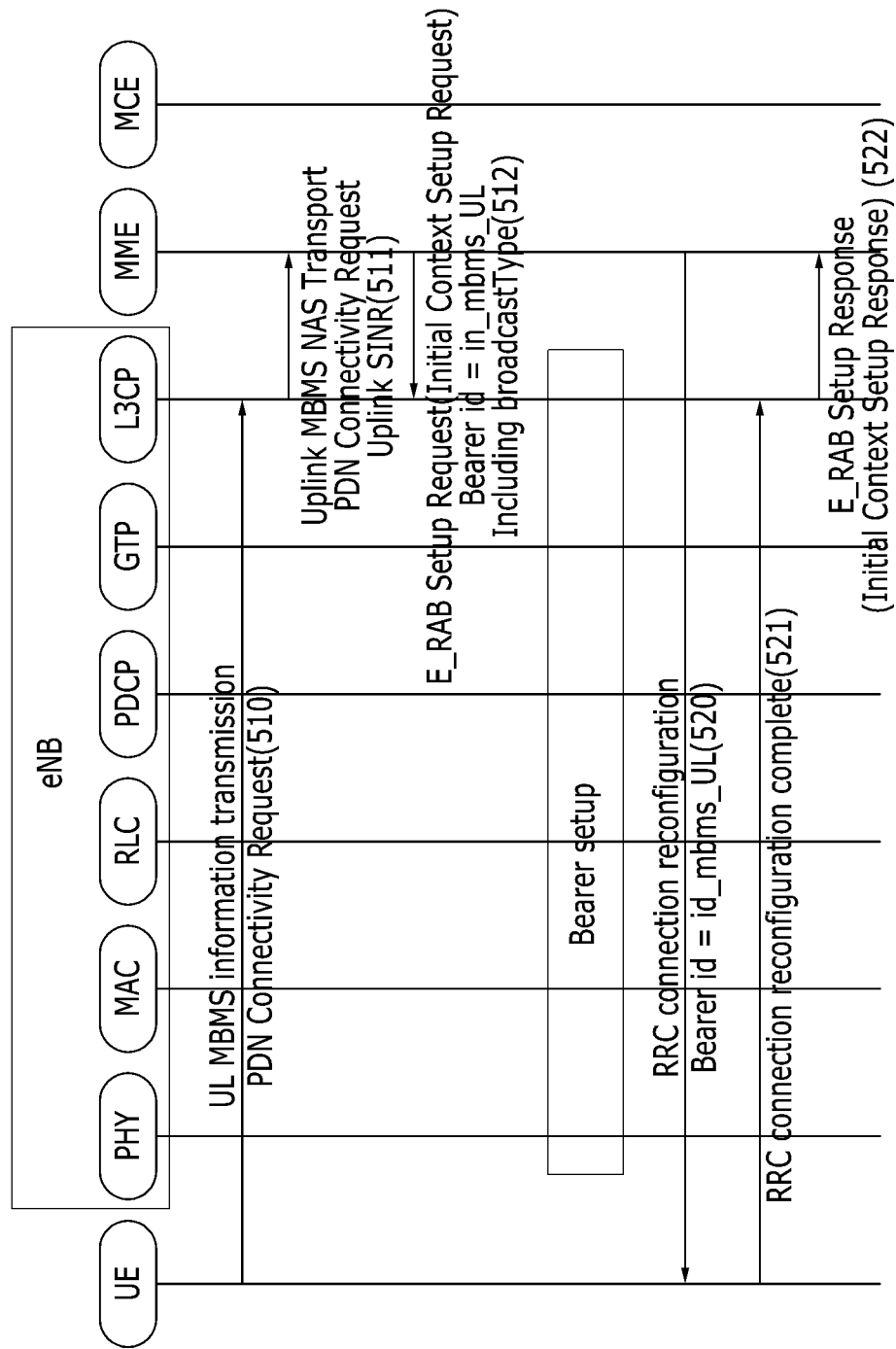
FIG. 5 is a flow chart for describing another scheme of a bearer setup procedure in the MBMS service system according to the exemplary embodiment of the present invention.

FIG. 5 is a flow chart for describing another scheme of a bearer setup procedure in the MBMS service system according to the exemplary embodiments of the present invention. Here, to activate the MBMS service, the case in which the UE does not transmit the NAS message but transmits a UL MBMS information transfer message, which is the RRC message to the base station 170 will be described.

In FIG. 5, first, the UE transmits the UL MBMS information transfer message to the base station 170 (510). At this point, the UL MBMS information transfer message includes information for notifying one corresponding to the PDN connectivity request as shown in the following [Table 3]. The content of the UL MBMS information transfer message is the same as "UL MBMS Information Transfer={PDN Connectivity Request}".

The introduction background of the UL MBMS information transfer message is because the base station 170 may not control a general NAS message. If the base station knows what type of uplink message currently starts from the terminal (UE), the base station 170 may transmit additional information to the MME 150 while the additional information is configured in the uplink message.

Therefore, unlike the NAS message interpreted only in the UE and the MME 150 like the PDN connectivity request message, the base station 170 receiving the UL MBMS information transfer message that is an RRC message copies {PDN Connectivity Request} that is a content thereof and transmits additional information {Uplink SINR} to the MME 150 through an S1AP (base station-MME) uplink MBMS NAS transport (NAS transmission) message by including the additional information {Uplink SINR} in the content (511). As shown in the following [Table 3], the content of the uplink MBMS NAS transport message is the same as "Uplink MBMS NAS Transport={PDN Connectivity Request, Uplink SINR}".

An uplink signal-to-interference-plus-noise ratio (SINR) (uplink signal-to-interference ratio) means an appropriate quality of service (QoS) at a portion where data are transmitted between the UE and the base station 170. The base station 170 transfers uplink SINR information to the MME 150 to refer to the uplink SINR information in the MME 150 when a quality of service (QoS) for a broadcast service session (MBMS session) is set later.

For example, when an uplink data transmission rate estimated on the basis of the uplink SINR is set to be 10 Mb/s, if the setup for the MBMS traffic is 1 Mb/s, a service may not be supported normally, and to the contrary, if the setup for the MBMS is 100 Mb/s, the resource may be inefficiently used. Therefore, in the present invention, a method for efficiently managing MBMS QoS uses the message for notifying the MME 150 of the uplink SINR by the base station 170.

TABLE 3

| Message | Included information | Remarks |
| --- | --- | --- |
| UL MBMS information transfer (UE → eNB, RRC) | ULMBMSInformationTransfer = PDN Connectivity Request | Determine that the Nas message is for the uplink bearer setup for the MBMS |
| Uplink MBMS NAS transport (eNB → MME, S1AP) | UplinkMBMSNASTransport = {PDN Connectivity Request, Uplink SINR} | Transfer the PDN connectivity request message including the UL SINR for MBMS QoS setup |

The process of transmitting the E_RAB setup request (or initial context setup request) message from the MME 150 to the base station 170 is similar to the process of 411 of FIG. 4 (512) and an RRC connection reconfiguration complete process and an E_RAB setup response (or initial context setup response) process are similar to the processes 420-422 of FIG. 4 (520-522).

<3. MBMS Setup>

Figure 6:
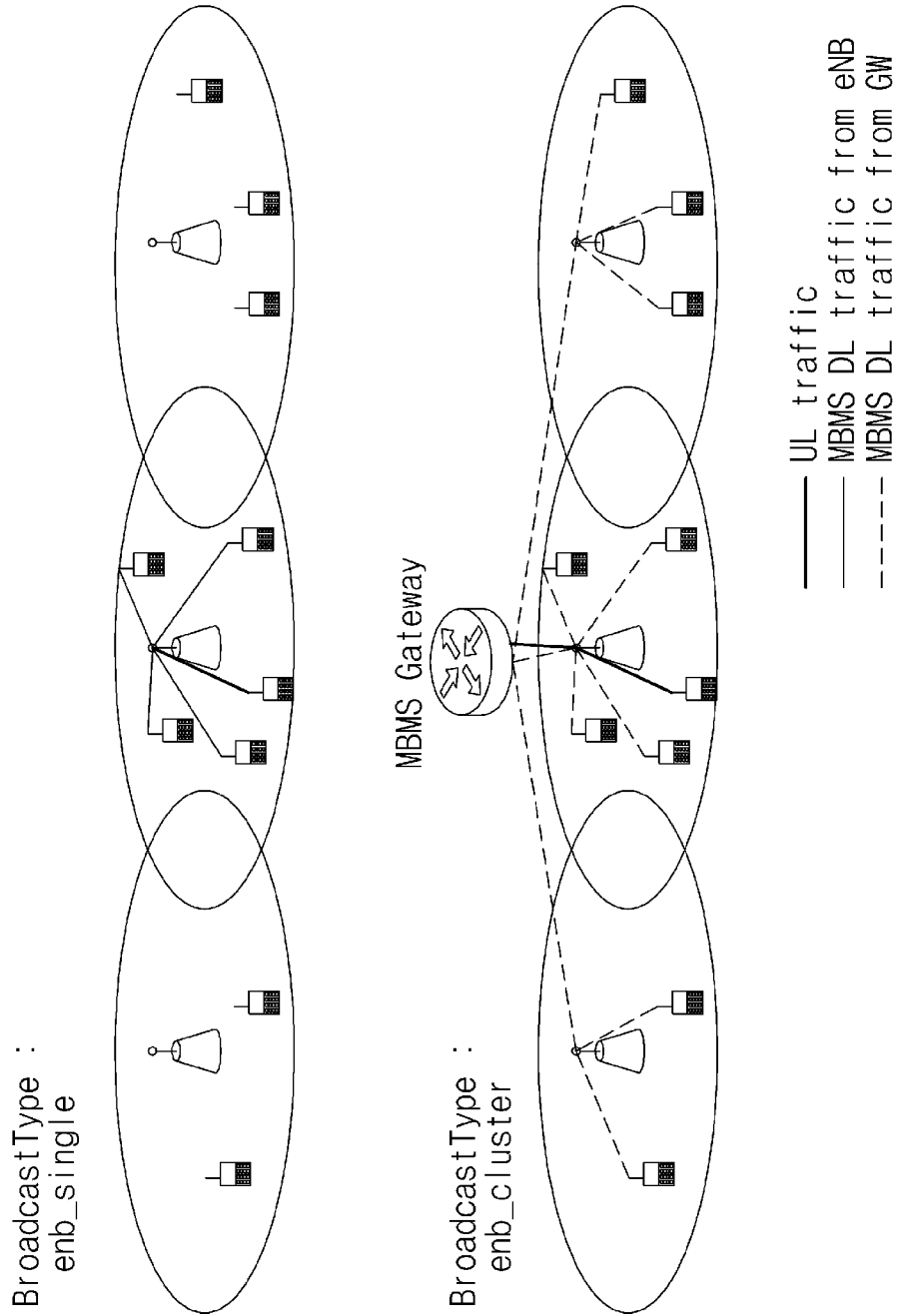
FIG. 6 is a diagram for describing a traffic flow depending on a broadcasting type in the MBMS service system according to the exemplary embodiment of the present invention.

If all the messages are normally processed by the above-mentioned two procedures, that is, <1. Identification procedure for personal broadcasting subscriber> and <2. Bearer setup procedure for LTE uplink data transmission>, after the E_RAM setup response (or initial context setup response) process, the MME 150 configures the MBMS session. The procedure of linking the UE, the MME 150, the MCE 160, and the base station 170 to each other and setting the MBMS session may depend on the content of the 3GPP standard and therefore the detailed description thereof will be omitted. At this point, it is assumed that the downlink bearer ID for setting, by the MME 150, the MBMS service is id_mbms_DL. When the broadcast type for the UE generating the uplink traffic is the enb_single (one base station), the MBMS session setup is the enb_single (one base station), the MBSS session is set only in the one corresponding base station and when the broadcast type for the UE is the enb_cluster (set of the base stations), the MBMS session is set in the plurality of base stations connected to the MCE 160 (refer to FIG. 6). As described above, the MME 150 notifies the MBMS GW 130 of the downlink bearer ID (id_mbms_DL) for being connected to the base station (s), the session information, or the like.

<4. Traffic Forwarding>

The present invention relates to a case in which broadcasting contents generated in a specific area are provided as the MBMS valid only in the corresponding area. In this case, since it is inefficient to transmit the broadcasting traffic up to the BMSC 120, a technology of handing off the broadcasting traffic at the base station 170 or the MBMS GW 130 stage is proposed. That is, if the <3. MBMS setup> procedure is completed, the MBMS setup procedure is completed, and thus the uplink traffic may be transmitted from the UE to the base station 170. The present invention determines a forwarding scheme at the base station 170 depending on the broadcastType and thus proposes a forwarding scheme of handing off and transmitting mobile communication (for example, LTE) uplink traffic to downlink MBMS traffic at the base station 170 or the MBMS GW 130.

<A. BroadcastType: Enb_Single>

Figure 7:
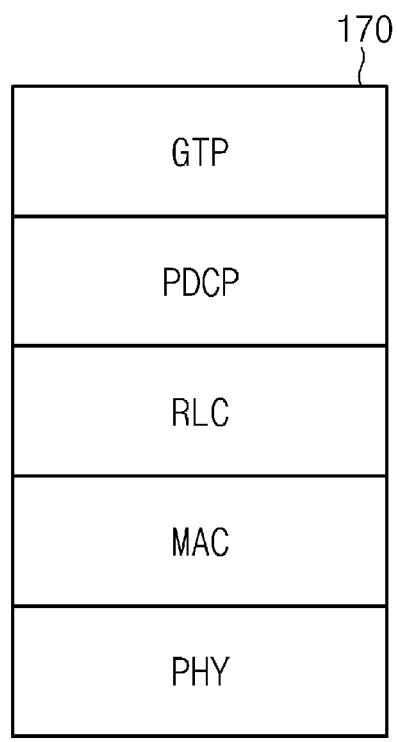
FIG. 7 is a diagram for describing a protocol stack of a base station processing user data in the MBMS service system according to the exemplary embodiment of the present invention.

FIG. 7 is a diagram for describing a protocol stack of the base station 170 processing user data in the MBMS service system according to the exemplary embodiment of the present invention.

When the broadcastType is the enb_single, the MBMS session is set only in the one corresponding base station 170 connected to the MCE 160 to transmit/receive data between the UE and the base station 170.

As illustrated in FIG. 7, the uplink traffic (broadcasting contents) transmitted from the UE is transmitted to the MBMS GW 130 on the network through PHY-MAC-RLC-PDCP-GTP layers. Among those, the PHY layer is not operated on the basis of the bearer ID (id_mbms_UL) and therefore may not perform the traffic forward function. It may be recognized that in the protocol of the MAC layer or more, the corresponding data need to be again broadcast from the uplink bearer ID (id_mbms_UL) of data received from the UE to the area of the base station 170 through the MBMS bearer (downlink bearer). However, a layer in which split packets are again reassembled and a complete packet is confirmed is the RLC layer, and therefore like the PHY, the traffic forwarding function may not be performed at the MAC layer.

Each of the RLC, PDCP, and GTP layers other than the PHY layer and the MAC layer may perform the traffic forwarding function. The detailed description of a header processed in the protocols of each layer is omitted in the present invention and only the process of processing user traffic is described. Further, it is assumed that when the traffic forwarding function is performed at the RLC layer, all the split packets are in an assembled state.

When the traffic forwarding function is performed at the RLC layer, there is a need to confirm a logical channel identifier as well as the uplink bearer ID. The data transmitted from the MAC layer are divided into a logical channel ID, not a data bearer ID and processed, and therefore the RLC layer needs to recognize at uplink bearer and MBMS bearer (downlink bearer) setup timing that a specific logical channel ID is mapped to a specific bearer ID. Further, like the bearer ID, the logical channel ID used at the MAC layer is also separately used in advance so that it may be appreciated that the logical channel ID is for the MBMS service.

Each of the RLC, PDCP, and GTP layers may know both of the bearer ID id_mbms_UL for the uplink data and the MBMS bearer (downlink bearer) id_mbms_DL (notified by the MME) and already knows that the uplink data (traffic) corresponding to the id_mbms_UL need to be again transmitted as downlink data through the MBMS bearer (downlink bearer) corresponding to the id_mbms_DL to be downloaded, by the processes such as the above procedures 1 to 3.

Figure 8:
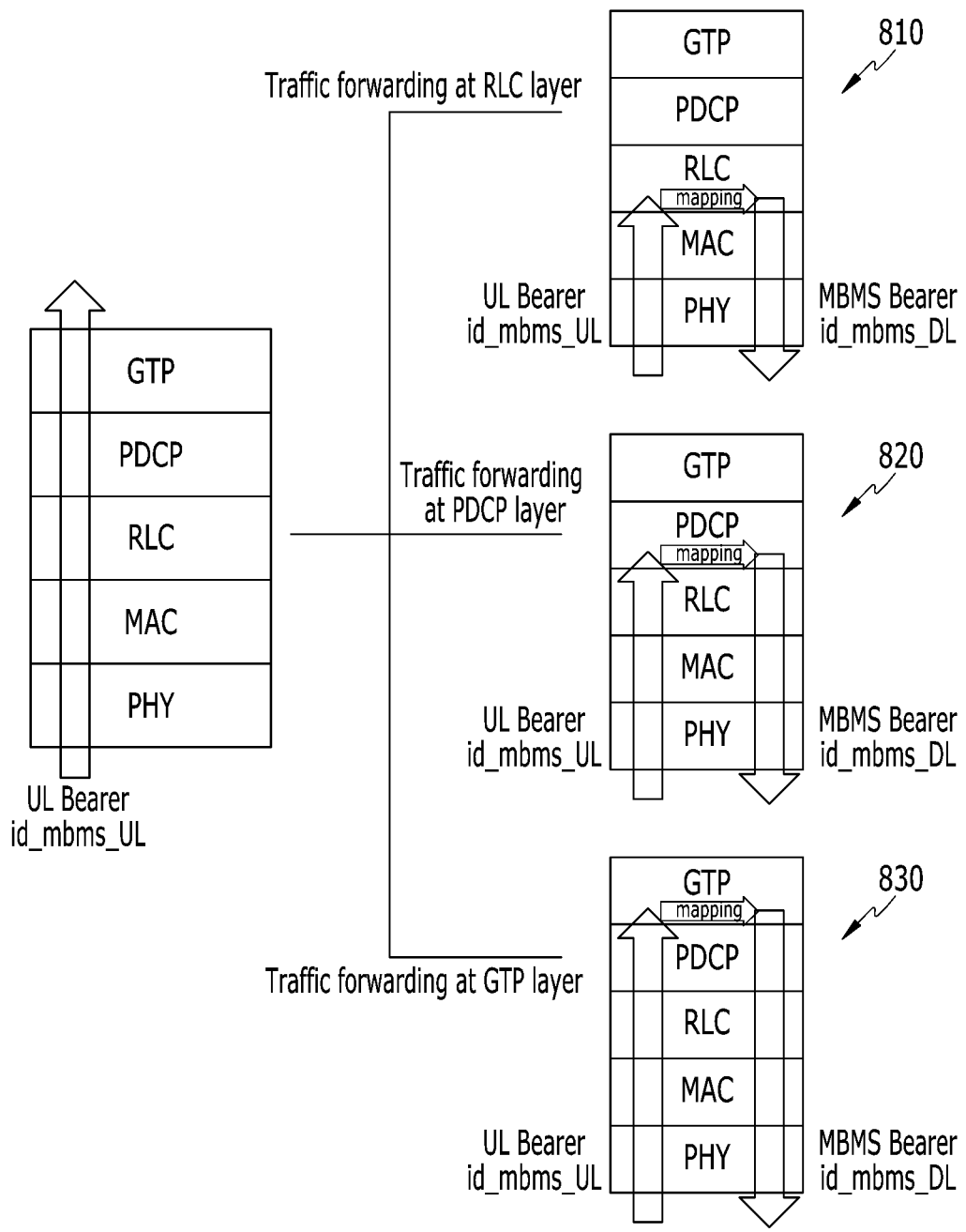
FIG. 8 is a diagram for describing an MBMS service through each protocol layer depending on the base station configuration in the MBMS service system according to the exemplary embodiment of the present invention.

FIG. 8 is a diagram for describing an MBMS service through each protocol layer depending on the base station configuration in the MBMS service system according to the exemplary embodiment of the present invention.

In FIG. 8, when the broadcastType is the enb_single, the uplink traffic (broadcasting contents) transmitted from the UE need not be processed by being transmitted up to the BMSC 120 and thus the base station 170 performs the MBMS service function at one of the RLC, PDCP, and the GTP layers depending on the session information to represent the case in which the uplink traffic directly serves (broadcast/multicast) again within the corresponding base station 170

For example, like 810, if the unlink traffic (broadcasting contents) is received from the UE through the uplink bearer id_mbms_UL, the base station 170 performs the MBMS service function at the RLC layer depending on the session information to be mapped to the downlink traffic (broadcasting contents) and again broadcasts/multicasts the corresponding downlink traffic (broadcasting contents) through the MBMS bearer (downlink bearer) id_mbms_DL by sequentially passing it through the MAC-PHY layers, such that other UEs may watch the downlink traffic.

As such, in the process of mapping the uplink traffic (broadcasting contents) to the MBMS bearer (downlink bearer), the base station 170 may be mapped to the downlink channel to a mobile communication (for example, LTE) physical multicast channel (PMCH) but is not limited thereto and therefore may be mapped to the downlink channel to a mobile communication (for example, LTE) physical downlink shared channel (PDSCH). Such a mapped channel has a physical difference but has the same logical concept and procedure.

Similarly, like 821 and 830, the base station 170 downlink-maps the uplink traffic (broadcasting content) to the PMCH channel or the PDSCH channel even at the PDCP or GTP layer depending on the session information to broadcast/multicast the uplink traffic, such that other UEs may watch the uplink traffic.

<b. broadcastType: Enb_Cluster>

In the MBMS service of the present invention, to synchronize between the respective base stations, a sync protocol (refer to the 3GPP standard) between the BMSC 120 and the base station 170 is required. In the MBMS service of the present invention, the sync protocol is equipped in the MBMS GW 130.

When the broadcastType is the enb_single, the MBMS is provided to only one base station 170 to which the UE transmitting the uplink traffic belongs and therefore in this case, as described in FIG. 8, the traffic forwarding is performed at the specific layer of the base station 170.

On the other hand, when the broadcastType is the enb_cluster, the uplink traffic is transmitted up to the MBMS GW 130 and thus the MBMS service needs to be provided through the plurality of base stations (including the base station transmitting the uplink traffic).

Figure 9:
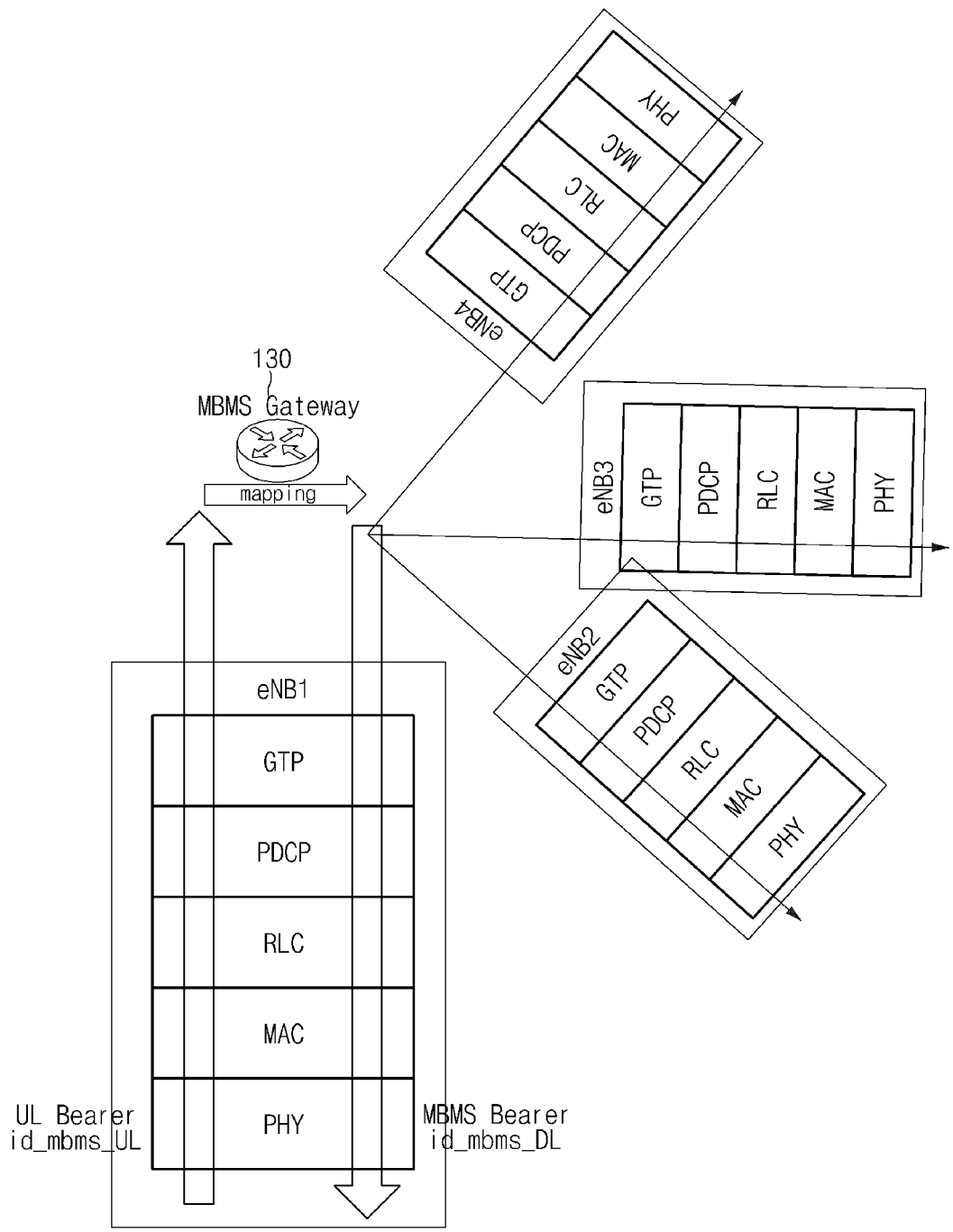
FIG. 9 is a diagram for describing a concept of providing an MBMS service through a plurality of base stations via an MBMS GW in the MBMS service system according to the exemplary embodiment of the present invention.

FIG. 9 is a diagram for describing a concept of providing an MBMS service through a plurality of base stations via an MBMS GW in the MBMS service system according to the exemplary embodiment of the present invention.

The existing gateway may transmit traffic only to a direction of the base station but in the MBMS service system of the present invention, the MBMS GW 130 may not only be transmitted the traffic (broadcasting contents) to the base station 170 but may also receive the traffic (broadcasting contents) from the base station 170.

For this purpose, as described above, the uplink bearer ID (Bearer id=id_mbms_UL) includes a GTP (UL) tunnel endpoint ID (TEID). In the corresponding uplink bearer, the uplink traffic (broadcasting contents) that the UE transmits may include the uplink bearer ID (for example, id_mbms_UL, TEID, or the like). When the broadcastType is the enb_cluster, the base station 170 receiving the uplink traffic (broadcasting contents) refers to the TEID to sequentially process the PHY-MAC-RLC-PDCP-GTP layers and then performs GTP packetization (for example, adds a new identifier depending on the protocol in addition to the internet protocol (IP) address) to transfer a packet to the MBMS GW 130, not to the PGW 140. The MBMS GW 130 performs the MBMS service function depending on the session information as described above to be mapped to the downlink traffic (broadcasting contents) and simultaneously transmits the corresponding downlink traffic (broadcasting contents) to the plurality of base stations through the MBMS bearer (downlink bearer) id_mbms_DL. The plurality of base stations performs the sequential processing of the GTP-PDCP-RLC-MAC-PHY layers on the corresponding downlink traffic (broadcasting contents) and broadcasts/multicasts the downlink traffic through the MBMS bearer (downlink bearer) id_mbms_DL, such that other UEs may watch the downlink traffic.

<c. MBMS Proxy Server>

The broadcasting contents generally mean a real-time video streaming service. For the mobile communication (for example, LTE) terminal to receive and play image data, a special technology of compressing/decompressing, or the like an image is required (for example, image data analysis by a specific codec). The base station 170 may include an MBMS proxy server 171 that performs and controls special processing on the compress/decompression of the image data, or the like. In some cases, the MBMS proxy server 171 may also be located on the network out of the base station 170. Hereinafter, the case in which the MBMS proxy server 171 is installed in the base station 170 is described but the case in which the MBMS proxy server 171 is installed out of the base station 170 may be similarly operated.

Figure 10:
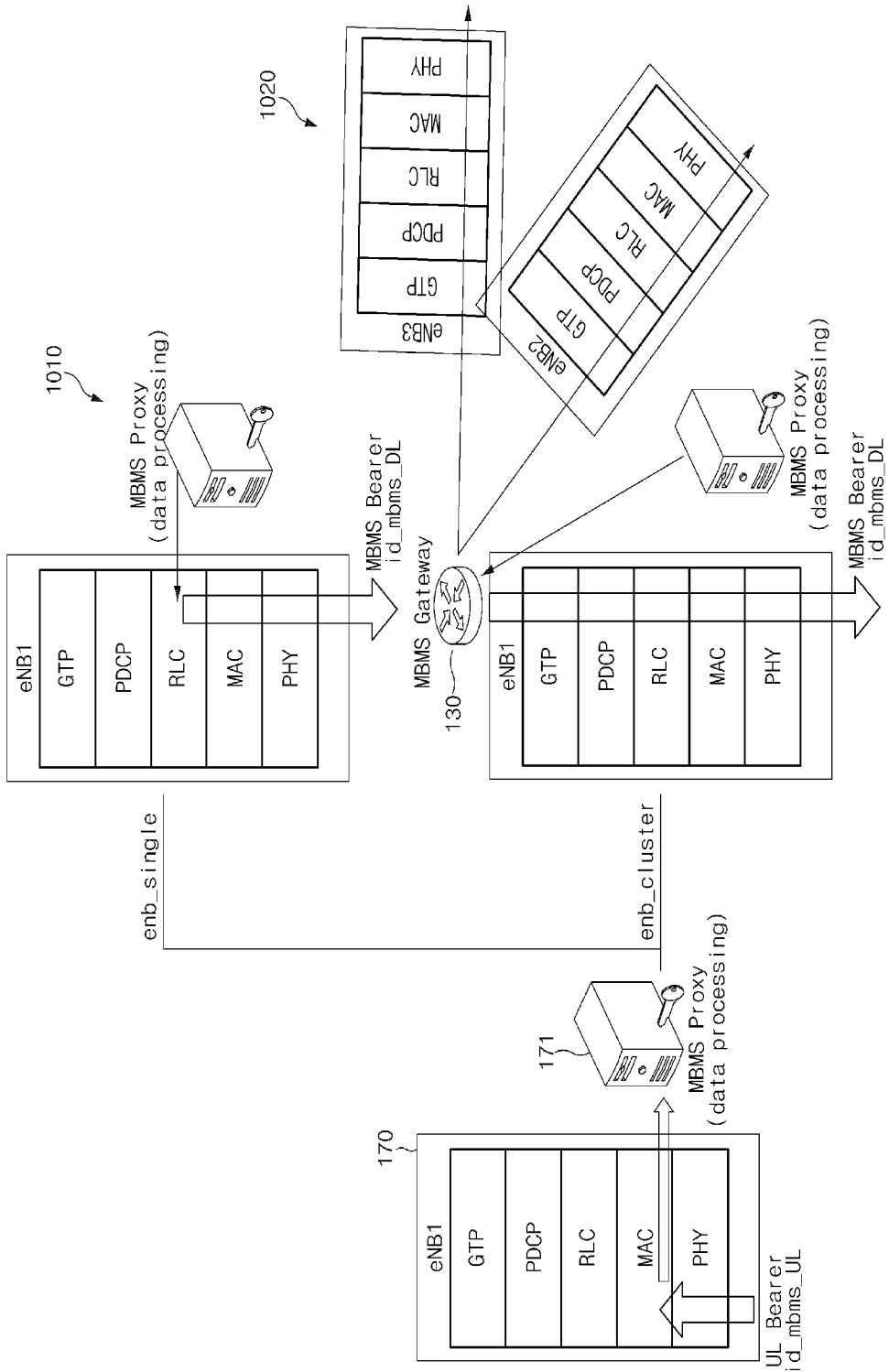
FIG. 10 is a diagram for describing a traffic transmitting/receiving relationship among an MBMS proxy server, the MBMS GW, and the base station in the MBMS service system according to the exemplary embodiment of the present invention.

FIG. 10 is a diagram for describing a traffic transmitting/receiving relationship among the MBMS proxy server, the MBMS GW, and the base station in the MBMS service system according to the exemplary embodiment of the present invention.

The MBMS proxy server 171 may not only perform several physical processings such as the compression/decompression of the image data, but may also perform the traffic forwarding function mentioned in a/b of the <4. traffic forwarding> phase The MBMS proxy server 171 shares the bearer related information such as id_mbms_UL and id_mbms_DL by the internal operation of the base station 170.

That is, the MBMS proxy server 171 includes the interface with the MAC/RLC to perform the traffic forwarding function (mapping the uplink traffic (broadcasting content) to the downlink, or the like) at each of the RLC, PDCP, and GTP layers like the above <a. broadcastType: enb_single> and may further include the interface with the PHY, the PDCP, and the GTP if necessary.

Further, the MBMS proxy server 171 has the interface with the MBMS GW 130 to perform the mapping of the traffic forwarding (uplink traffic (broadcasting contents) to the MBMS GW to the downlink when the broadcastType is the enb_cluster like the above <b. broadcastType: enb_cluster>.

For example, in the uplink traffic (broadcasting contents), the base station 170 performs the processing at the MAC layer that may first confirm the bearer ID and then may unconditionally transmit the corresponding traffic to the MBMS proxy server 171.

Next, the MBMS proxy server 171 receiving the traffic processed at the MAC layer of the base station 170 primarily processes the image data of the traffic according to the transmission/reception standard and when the broadcastType is the enb_single, transmits the processed uplink traffic (broadcasting contents) to the RLC layer of the base station 170 to broadcast/multicast it through the MAC-PHY layers (1010). In some cases, after the sequential processing of the RLC-PDCP-GTP layers, the downlink transmission to the processing of the GTP-PDCP-RLC-MAC-PHY layers may be made (refer to FIG. 8).

Alternatively, when the broadcastType is the enb_cluster, the MBMS proxy server 171 receiving the traffic processed at the MAC layer of the base station may primarily process the image data of the traffic according to the transmission/reception standard and may GTP-packetize the processed traffic for the MBMS and transmit the traffic to the MBMS GW 130 (1020). Accordingly, the MBMS GW 130 performs the MBMS service function on the GTP packet depending on the session information as described above to be mapped to the downlink traffic (broadcasting contents) and may simultaneously transmit the corresponding downlink traffic (broadcasting contents) to the plurality of base stations through the MBMS bearer (downlink bearer) id_mbms_DL (refer to FIG. 9).

According to an exemplary embodiment of the present invention, the method and apparatus for controlling an MBMS service using a mobile communication (for example, LTE) system may efficiently control and manage the effective MBMS broadcasting service only at the specific location in the mobile communication (for example, LTE) system. For example, it is possible to more efficiently manage the effective MBMS content only in the specific cell or the specific cluster (set of the specific cells).

Figure 11:
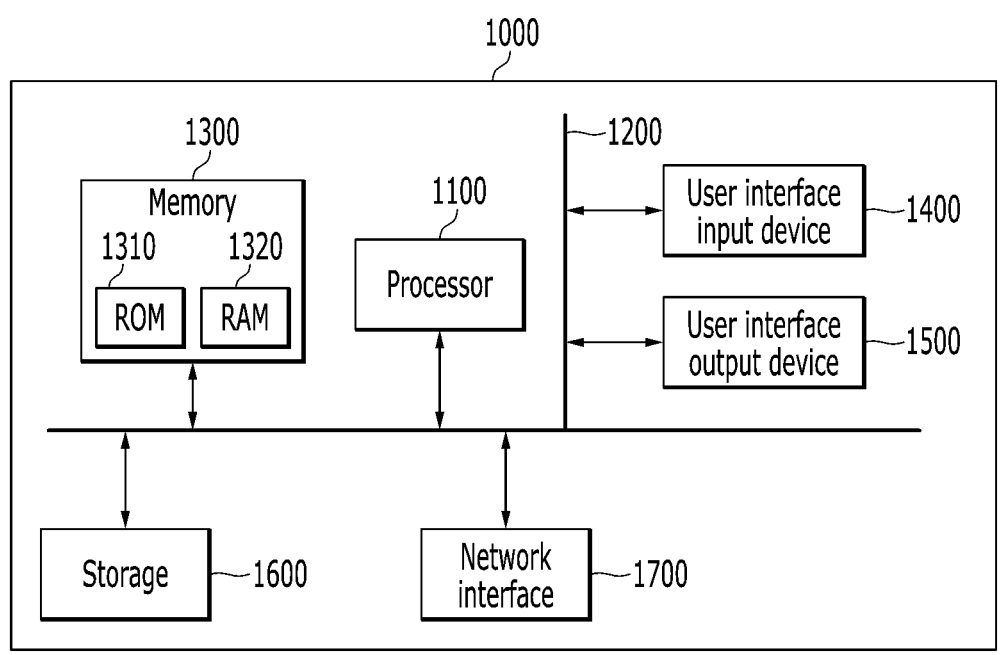
FIG. 11 is a diagram for describing an example of an implementation method of components of the MBMS service system according to the exemplary embodiment of the present invention.

FIG. 11 is a diagram for describing an example of an implementation method of components of the MBMS service system according to the exemplary embodiment of the present invention. The contents provider 110, the BMSC 120, the MBMS GW 130, the PGW 140, the MME 150, the MCE 160, the base station 170, the MBMS proxy server 171, or the like of the MBMS service system according to the exemplary embodiment of the present invention may be made by hardware, software, or a combination thereof. For example, the components of the MBMS service system according to the exemplary embodiment of the present invention may be implemented by a computing system 1000 as illustrated in FIG. 11.

The computing system 1000 may include at least one processor 1100, a memory 1300, a user interface input device 1400, a user interface output device 1500, a storage 1600, and a network interface 1700 that are connected via a bus 1200. The processor 1100 may be a semiconductor device that executes processing on commands stored in a central processing unit (CPU), the memory 1300, and/or the storage 1600. The memory 1300 and the storage 1600 may include various kinds of volatile or non-volatile storage media. For example, the memory 1300 may include a read only memory (ROM) 1310 and a random access memory (RAM) 1320.

The method or the algorithm process that is described with reference to the exemplary embodiments disclosed in the present specification may be directly implemented by hardware and software modules executed by the processor 1100 or a combination thereof. The software module may reside in storage media (i.e., memory 1300 and/or storage 1600) such as a RAM memory, a flash memory, a ROM memory, an EPROM memory, an EEPROM memory, a register, a hard disk, a detachable disk, and a CD-ROM. The exemplary storage medium is coupled with the processor 110 and the processor 1100 may read information from the storage media and may write the information in the storage media. As another method, the storage medium may also be integrated with the processor 1100. The processor and the storage media may also reside in an application specific integrated circuit (ASIC). The ASIC may reside in the UE. As another method, the processor and the storage media may also reside within the UE as individual components.

As described above, the method and apparatus for controlling a mobile communication (for example, LTE) MBMS service according to the exemplary embodiment of the present invention may efficiently control and manage the valid MBMS service only at a specific location in the MBMS service system. For example, it is possible to more efficiently manage the effective MBMS content only in the specific cell (base station) or the specific cluster (set of the specific cells).

The spirit of the present invention has been just exemplified. It will be appreciated by those skilled in the art that various modifications and alterations can be made without departing from the essential characteristics of the present invention. For example, the LTE as the example of the mobile communication is described above by way of example, which is only an example and may be similarly applied even to various radio communication field-based MBMS services instead of the instead of the LTE.

Accordingly, the embodiments disclosed in the present invention are used not to limit but to describe the spirit of the present invention. The scope of the present invention is not limited only to the embodiments. The protection scope of the present invention must be analyzed by the appended claims and it should be analyzed that all spirits within a scope equivalent thereto are included in the appended claims of the present invention.

What is claimed is:

1. A method for providing a local Multimedia Broadcast Multicast Service (MBMS) by which contents of an uplink user equipment (UE) are broadcasted to a plurality of UEs located in a predetermined area according to a base station forwarding scheme, the method comprising:
    receiving, from the uplink UE, a radio resource control (RRC) message including a packet data network (PDN) connectivity request for establishing an uplink bearer through which the contents are delivered from the uplink UE to a base station;
    transmitting an uplink MBMS message including the PDN connectivity request and information about service quality of the local MBMS to a core network;
    establishing the uplink bearer between the uplink UE and the base station based on a radio access bearer (RAB) setup request message received from the core network, wherein the RAB setup request message includes broadcast type information of the contents; and
    broadcasting the contents received through the uplink bearer from the uplink UE to the plurality of UEs located in the predetermined area based on the broadcast type information without transferring the contents to the core network.

2. The method of claim 1, wherein the broadcasting the contents received through the uplink bearer from the uplink UE to the plurality of UEs located in the predetermined area based on the broadcast type information without transferring the contents to the core network includes:
    mapping the contents to downlink broadcasting contents at a radio link control (RLC) layer; and
    broadcasting the downlink broadcasting contents at the predetermined area through a downlink bearer between the base station and the plurality of UEs.

3. The method of claim 1, wherein the broadcasting the contents received through the uplink bearer from the uplink UE to the plurality of UEs located in the predetermined area based on the broadcast type information without transferring the contents to the core network includes:
   mapping the contents to downlink broadcasting contents at a packet data convergence protocol (PDCP) layer; and
   broadcasting the downlink broadcasting contents at the predetermined area through a downlink bearer between the base station and the plurality of UEs.

4. The method of claim 1, wherein the broadcasting the contents received through the uplink bearer from the uplink UE to the plurality of UEs located in the predetermined area based on the broadcast type information without transferring the contents to the core network includes:
   mapping the contents to downlink broadcasting contents at a GPRS tunneling protocol (GTP) layer; and
   broadcasting the downlink broadcasting contents at the predetermined area through a downlink bearer between the base station and the plurality of UEs.

5. The method of claim 1, wherein the broadcasting the contents received through the uplink bearer from the uplink UE to the plurality of UEs located in the predetermined area based on the broadcast type information without transferring the contents to the core network includes transferring the contents to an MBMS gateway so that the contents are broadcasted from a cluster of base stations when the broadcast type information indicates broadcasting the contents through the cluster of base stations.

6. The method of claim 1, wherein the information about the service quality of the local MBMS is an uplink signal to interference plus noise ratio (SINR) information for estimating an uplink transmission rate of the contents.

7. A base station for providing a local Multimedia Broadcast Multicast Service (MBMS) by which contents of an uplink user equipment (UE) are broadcasted to a plurality of UEs located in a predetermined area according to a base station forwarding scheme, comprising:
   a processor, a memory, and a network interface,
   wherein the processor executes a program included in the memory to perform:
   receiving, from the uplink UE user equipment (UE), a radio resource control (RRC) message including a packet data network (PDN) connectivity request for establishing an uplink bearer through which the contents are transferred from the uplink UE to the base station;
   transmitting an uplink MBMS message including the PDN connectivity request and information about service quality of the local MBMS to a core network;
   establishing the uplink bearer between the uplink UE and the base station based on a radio access bearer (RAB) setup request message received from the core network, wherein the RAB setup request message includes broadcast type information of the contents; and
   broadcasting the contents received through the uplink bearer from the uplink UE to the plurality of UEs located in the predetermined area based on the broadcast type information without transferring the contents to the core network.

8. The base station of claim 7, wherein when the broadcasting the contents received through the uplink bearer from the uplink UE to the plurality of UEs located in the predetermined area based on the broadcast type information without transferring the contents to the core network, the processor executes the program to perform:
   mapping the contents to downlink broadcasting contents at a radio link control (RLC) layer; and
   broadcasting the downlink broadcasting contents at the predetermined area through a downlink bearer between the base station and the plurality of UEs.

9. The base station of claim 7, wherein when the broadcasting the contents received through the uplink bearer from the uplink UE to the plurality of UEs located in the predetermined area based on the broadcast type information without transferring the contents to the core network, the processor executes the program to perform:
   mapping the contents to downlink broadcasting contents at a packet data convergence protocol (PDCP) layer; and
   broadcasting the downlink broadcasting contents at the predetermined area through a downlink bearer between the base station and the plurality of UEs.

10. The base station of claim 7,
   when the broadcasting the contents received through the uplink bearer from the uplink UE to the plurality of UEs located in the predetermined area based on the broadcast type information without transferring the contents to the core network, the processor executes the program to perform:
   mapping the contents to downlink broadcasting contents at a GPRS tunneling protocol (GTP) layer; and
   broadcasting the downlink broadcasting contents at the predetermined area through a downlink bearer between the base station and the plurality of UEs.

11. The base station of claim 10, wherein when the processor performs the broadcasting the contents received through the uplink bearer from the uplink UE to the plurality of UEs located in the predetermined area based on the broadcast type information without transferring the contents to the core network, the processor executes the program to perform transferring the contents to an MBMS gateway so that the contents are broadcasted from a cluster of base stations when the broadcast type information indicates broadcasting the contents through the cluster of base stations.

12. The base station of claim 7, wherein the information about the service quality, of the local MBMS is an uplink signal to interference plus noise ratio (SINR) information for estimating an uplink transmission rate of the contents.

* * * * *